(12) United States Patent
van der Lugt et al.

(10) Patent No.: US 9,740,536 B2
(45) Date of Patent: Aug. 22, 2017

(54) METHOD OF ACHIEVING INTRA-MACHINE WORKLOAD BALANCE FOR TASK CHUNKS FOR DISTRIBUTED GRAPH-PROCESSING SYSTEMS

(71) Applicant: Oracle International Corporation, Redwood Shores, CA (US)

(72) Inventors: Jan van der Lugt, San Francisco, CA (US); Merijn Verstraaten, Amstelveen (NL); Sungpack Hong, Palo Alto, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 174 days.

(21) Appl. No.: 14/718,430

(22) Filed: May 21, 2015

(65) Prior Publication Data
US 2016/0342445 A1    Nov. 24, 2016

(51) Int. Cl.
*G06F 9/46* (2006.01)
*G06F 9/50* (2006.01)
*G06F 17/30* (2006.01)
*G06F 9/44* (2006.01)
*G06F 9/45* (2006.01)
*H04L 29/08* (2006.01)

(52) U.S. Cl.
CPC .............. *G06F 9/5083* (2013.01); *G06F 8/31* (2013.01); *G06F 8/456* (2013.01); *G06F 17/30321* (2013.01); *G06F 17/30386* (2013.01); *G06F 17/30442* (2013.01); *G06F 17/30958* (2013.01); *H04L 67/10* (2013.01)

(58) Field of Classification Search
None
See application file for complete search history.

(56) References Cited

U.S. PATENT DOCUMENTS

2016/0140152 A1   5/2016   Sevenich et al.
2016/0292303 A1   10/2016  Hong

OTHER PUBLICATIONS

Karypis et al; Multilevel Algorithms for Multi-Constraint Graph Partitioning, University of Minnesota, May 5, 1998.*
Xin et al., "GraphX Resilient Distributed Graph System on Spark", dated Jun. 23, 2013, Proceedings of the First International Workshop on Graph Data Management, 6 Pages.
(Continued)

*Primary Examiner* — Bing Zhao
(74) *Attorney, Agent, or Firm* — Hickman Palermo Becker Bingham LLP

(57) ABSTRACT

Techniques are provided for efficiently distributing graph data to multiple processor threads located on a server node. The server node receives graph data to be processed by the server node of a graph processing system. The received graph data is a portion of a larger graph to be processed by the graph processing system. In response to receiving graph data the server node compiles a list of vertices and attributes of each vertex from the graph data received. The server node then creates task chunks of work based upon the compiled list of vertices and their corresponding attribute data. The server node then distributes the task chunks to a plurality of threads available on the server node.

20 Claims, 8 Drawing Sheets

(56) References Cited

OTHER PUBLICATIONS

Open MP Application Program, http://www.openmp.org/mp-documents/OpenMP_4.0_RC2.pdf dated 2013, 418 pages.
Nelson et al., "Latency-Tolerant Software Distributed Shared Memory", Technical Report UW-CSE-14-05-03, dated 2014, 13 pages.
Malewicz et al., "Pregel: A System for Large-Scale Graph Processing", SIGMOD, ACM, dated Jun. 2010, 11 pages.
Low et al., "GraphLab: A New Framework for Parallel Machine Learning", dated Jun. 25, 2010, 10 pages.
http://docs.oracle.com/javase/7/docs/api/java/util/concurrent/ForkJoinPool.html, "Class ForkJoinPool", last viewed May 20, 2015, 11 pages.
Grappa, "Scaling Data-intensive Applications on Commodity Clusters", http://grappa.io/, last viewed on May 6, 2015, 4 pages.
Giraph "Introduction to Apache Giraph", http://giraph.apache.org/intro.html, last viewed on May 6, 2015, 2 pages.
Dato.com, "GraphLab Create User Guide", Introduction, 1 page, last viewed on May 6, 2015, 1 page.

* cited by examiner

FIG. 2A Sample Graph
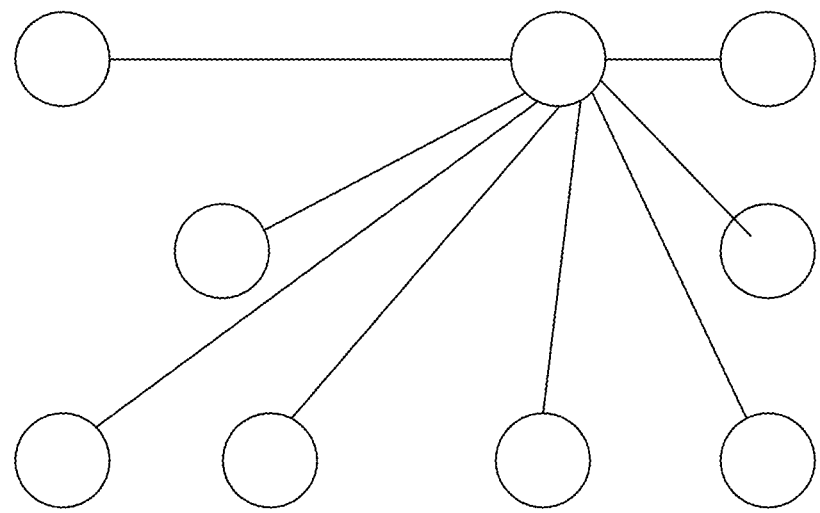
FIG. 2B
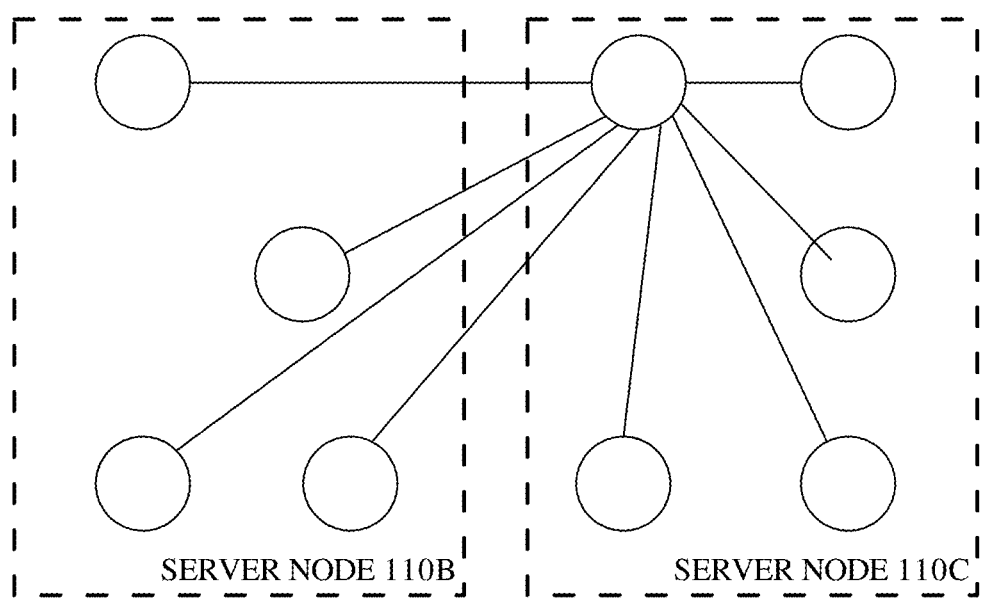

METHOD OF ACHIEVING INTRA-MACHINE WORKLOAD BALANCE FOR TASK CHUNKS FOR DISTRIBUTED GRAPH-PROCESSING SYSTEMS

CROSS-REFERENCE TO RELATED APPLICATIONS; BENEFIT CLAIM

This application is related to U.S. patent application Ser. No. 14/524,838, filed on Oct. 27, 2014, the entire content of which is hereby incorporated by reference.

This application is related to U.S. patent application Ser. No. 14/543,058, filed on Nov. 17, 2014, the entire content of which is hereby incorporated by reference.

FIELD OF THE DISCLOSURE

The present disclosure relates generally to graph processing, and more specifically, to intra-server node graph data workload distribution within a server node that has multiple processor cores.

BACKGROUND

Graph analysis is a type of data analysis where the dataset is modeled as a graph. Graph analysis is used to identify arbitrary relationships between data entities. By applying certain graph analysis algorithms on a graph, a user may be able to discover non-immediate insight about the data set as analysis may consider even indirect relationships between data entities.

Many different data sets can be represented as graphs. For example, friendship relationships in a social network naturally form a graph. Real-world graphs, such as social network graphs, exhibit different characteristics than classic graphs, such as trees, meshes, and hyper-cubes. As an example of a characteristic, real-world graphs show power-law degree distribution, this means that most vertices in the graph have only a small number of edges, while a few vertices have an extremely large number of edges. For example, according to the degree distribution of Twitter's follower graph, about 96% of all vertices have less than 100 edges, while about 0.01% of all vertices are connected to 25% of all edges in the graph, with roughly one hundred vertices having more than $10^6$ edges. These types of vertices are referred to as super high-degree vertices.

Graph analysis programs are parallelized by exploiting their inherent vertex-parallelism. In other words, a certain function is applied to every vertex in the graph in parallel. Often the "vertex function" iterates over all the edges of a vertex. Graph processing systems may make use of this vertex-parallelism. Graph processing workload may be distributed across multiple server nodes that make up a cluster of server nodes. By distributing the workload over multiple server nodes, each server node is able to implement graph processing on a separate "chunk" of vertices.

Many types of server nodes are equipped with the ability to process multiple threads at one time using multiple hardware threads and multiple software threads for each processor running the graph processing program. By doing so, each server node is able to efficiently implement vertex-parallelism on the assigned chunk of vertices. However, exploiting vertex-parallelism may lead to serious performance issues when applied to real-world graph instances. For example, a vertex function iterates over all edges belonging to a vertex. The extreme skewedness of the degree distribution leads to poor load balancing between different threads. That is, one thread deals with the super high-degree vertices and most of the other threads only deal with low-degree vertices. Such poor load balancing adversely affects the overall performance of a server node and could completely negate the positive effects of parallelization One approach to address the issue of extreme degree distribution skewedness is to apply chunking and work stealing. In this scheme, vertices of a graph are partitioned into multiple chunks (or sets) where each chunk has the same (or similar) number of vertices. Each thread picks up one chunk and processes the vertices belonging to the thread. When a thread finishes its chunk, the thread either grabs a new chunk or, if the work queue is empty, "steals" another chunk from another thread that still has unprocessed chunks in its respective chunk queue. Although this approach somewhat reduces the load balancing problem, it is not a perfect solution. For example, if a graph contains a super high-degree vertex to which 60% of all the vertices in the graph are connected, then the chunk that contains the super high-degree vertex will cause significant workload imbalance.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIGS. 2A and 2B depict a sample graph consisting of vertices and edges and distributing portions of the graph to multiple server nodes.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for efficiently distributing graph data to multiple processor threads located on a server node.

The server node receives graph data to be processed by the server node of a graph processing system. The received graph data is a portion of a larger graph to be processed by the graph processing system. In response to receiving graph data, the server node compiles a list of vertices and attributes of each vertex from the graph data received. The server node then creates task chunks of work based upon the compiled list of vertices and their corresponding attribute data. The server node then distributes the task chunks to a plurality of threads available on the server node.

Figure 1:
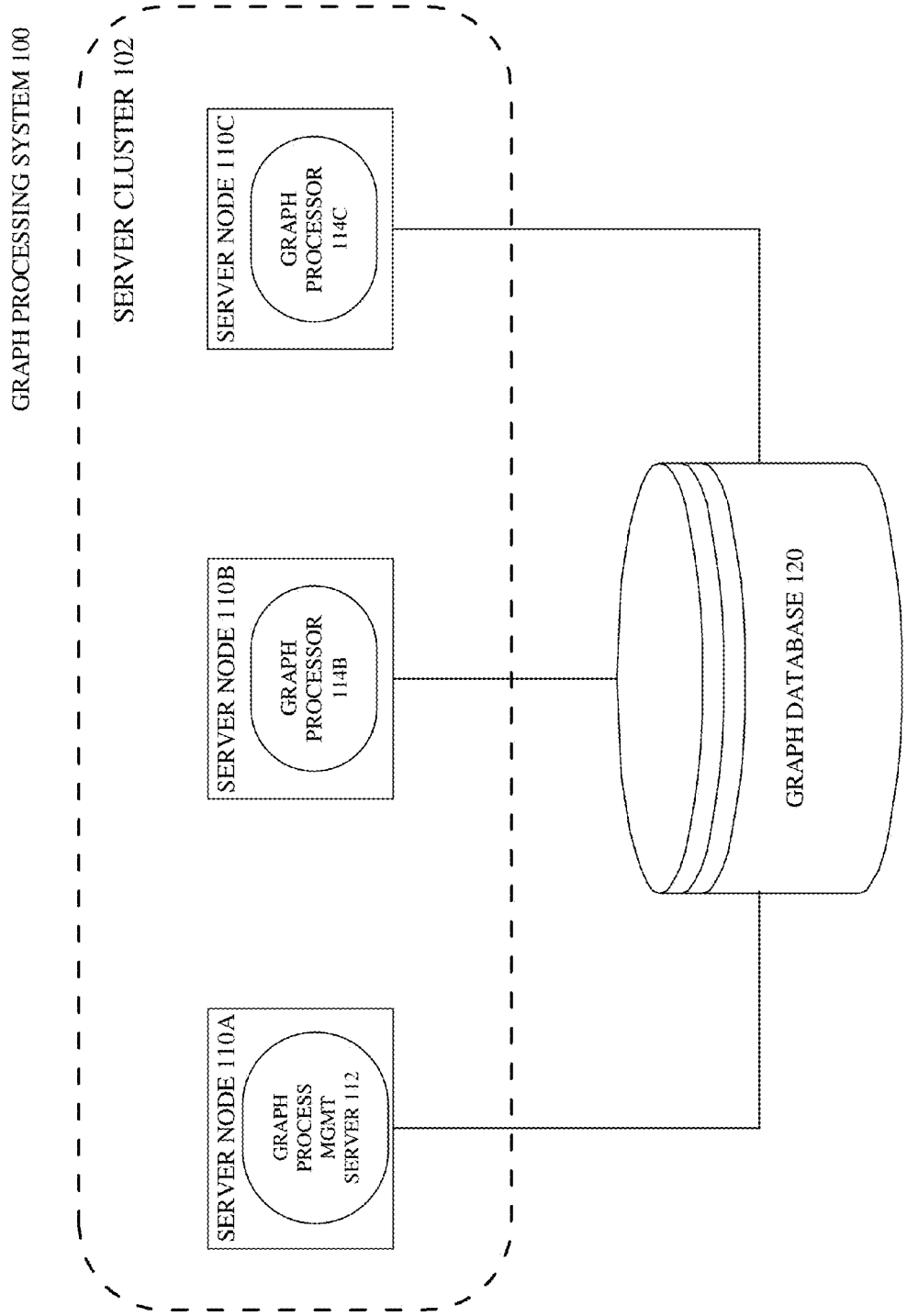
FIG. 1 is a block diagram that depicts an example a graph processing system.

In an embodiment, FIG. 1 is a block diagram that depicts an example graph processing system 100. The graph processing system 100 includes a server cluster 102 of server nodes 110A-110C and a graph database 120. Embodiments of the graph database 120 include, but are not limited to, a type of storage system configured to persistently store one or more datasets in a structured format, each modeled as a graph, which is described in more detail below.

Although no clients are depicted in FIG. 1, multiple clients may be communicatively coupled, through one or more networks, to graph processing system 100. The clients are configured to send graph analytic requests to graph processing system 100.

The graph process management server is a component that is implemented on one or more computing devices, such as a server node. If graph process management server 112 is implemented on multiple computing devices, then the computing devices may be coupled to each other. The graph process management server 112 may be implemented in software, hardware, or any combination of software and hardware. In the embodiment depicted in FIG. 1, the graph process management server 112 is implemented on server node 110A. Other embodiments, may implement an instance of the graph process management server 112 on more than one server node or even all of the server nodes.

In an embodiment, the graph process management server 112 receives a graph analytic request and determines how to distribute portions of a graph to other server nodes for processing. A graph comprises vertices and edges that represent relationships between the vertices. A detailed description of graph data is discussed in the GRAPH DATA section herein. The graph analytic request is a processing request that is applied to each of the vertices within the graph. The graph process management server 112 analyzes the vertices and edges that make up the graph and creates chunks of vertices to be distributed to available server nodes for parallel processing. A chunk is a portion of the graph comprising of a set of vertices and the associated edges for that set of vertices.

FIG. 2A depicts a graph consisting of vertices and edges. When the graph process management server 112 receives a graph analytic request, the graph process management server 112 creates multiple chunks of vertices and edges and distributes the chunks to available server nodes within the server cluster 102.

FIG. 2B depicts an embodiment of the graph process management server 112 distributing chunks of the graph to server node 110B and server node 110C for processing. Here, the graph process management server attempts to balance the amount of data between server node 110B and server node 110C by creating chunks based upon the number of vertices to be processed. Other embodiments may distribute the chunks based upon the number of edges or a combination between the number of vertices and edges.

In an embodiment, server nodes 110B and 110C receive chunk processing requests from the graph process management server 112 on server node 110A. Graph processors 114B and 114C access the graph data corresponding to their assigned chunk from the graph database 120 for graph analytic processing. In order to efficiently process the received chunk, a graph processor utilizes the multiple processors and multiple cores on the server node to process vertices within the received chunk in parallel.

Figure 3:
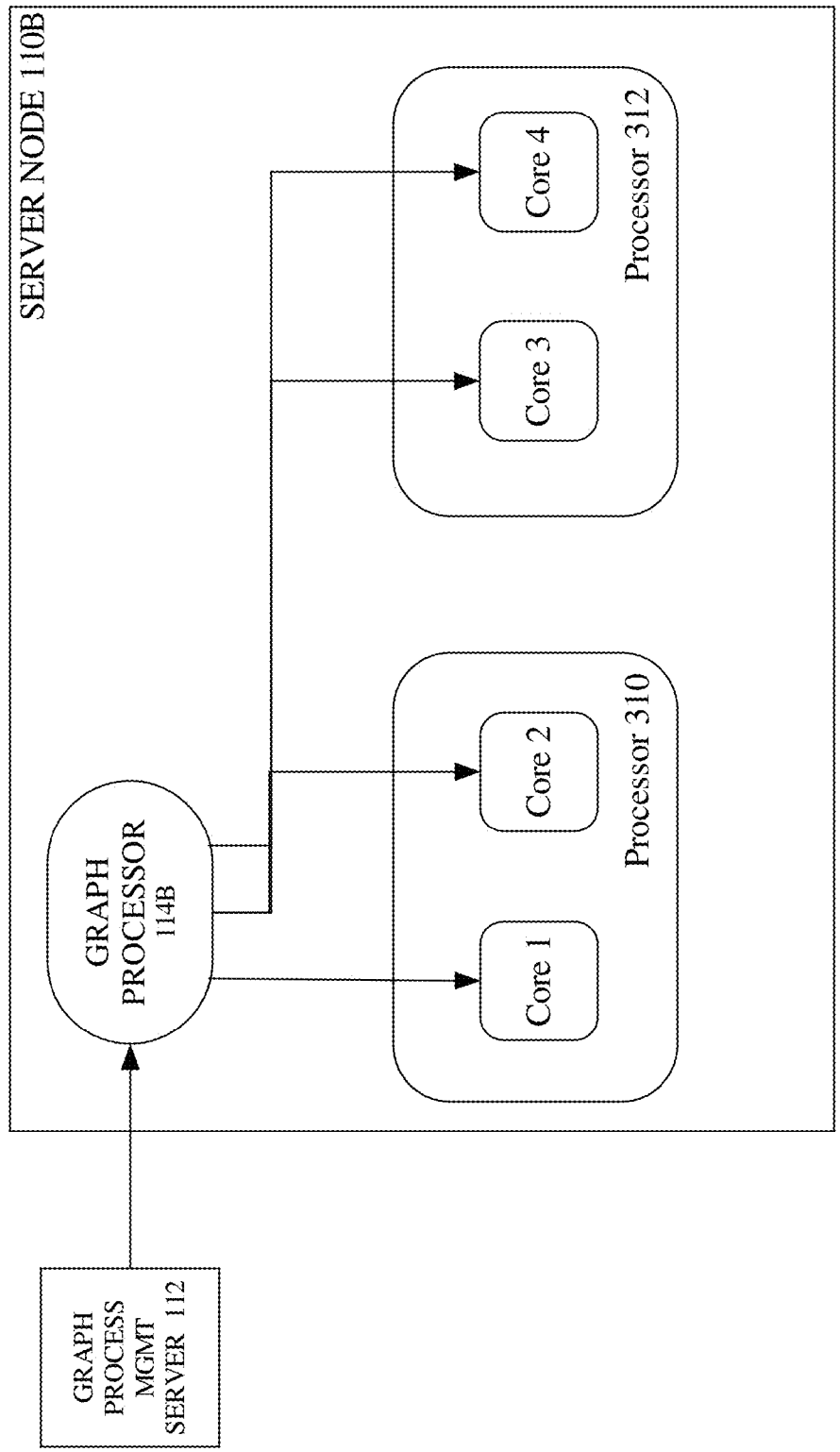
FIG. 3 is a block diagram depicting an embodiment of a server node receiving a chunk from a graph process management server and dividing the chunk into multiple task chunks for available processor threads.

FIG. 3 depicts an embodiment of server node 110B receiving a chunk processing request from the graph process management server 112 and the graph processor 114B creating smaller task chunks to distribute to each of the available threads within multi-core processors. A multi-core processor is single computing component with two or more independent processing units called "cores" on the same chip. A core is a processor circuitry unit that reads and executes program instructions in the form of threads. Having multiple cores allows for the ability to execute multiple threads at the same time, thereby increasing overall speed for programs. After receiving the chunk, the graph processor 114B creates smaller task chunks from the chunk and distributes those task chunks to available cores. In an embodiment, the graph processor 114B creates evenly sized task chunks by ensuring that each task chunk has a similar number of edges. In another embodiment, evenly sized task chunks may be based upon the number of vertices. By creating evenly sized task chunks, the graph processor 114B can minimize processing time by maximizing the amount of parallel threads running. For example, the graph processor 114B may create 4 smaller chunks and send each chunk to each of the cores 1-4 on processors 310 and 312.

Process Overview

In order to achieve intra-node work balancing the graph processor 114B creates task chunks of near equal size. By have nearly equally sized task chunks it reduces the possibility of processing bottlenecks. Graph processing procedures are given as iterations of parallel tasks. A processing bottleneck occurs when a single thread uses an excessive amount of time to process an iteration compared to other threads. In this scenario, the other threads process their task chunks sooner and are left waiting for the first thread to finish processing its iteration. Therefore the goal of the graph processor is to create and distribute equally sized task chunks to available threads for parallel processing with minimal bottlenecks.

Figure 4:
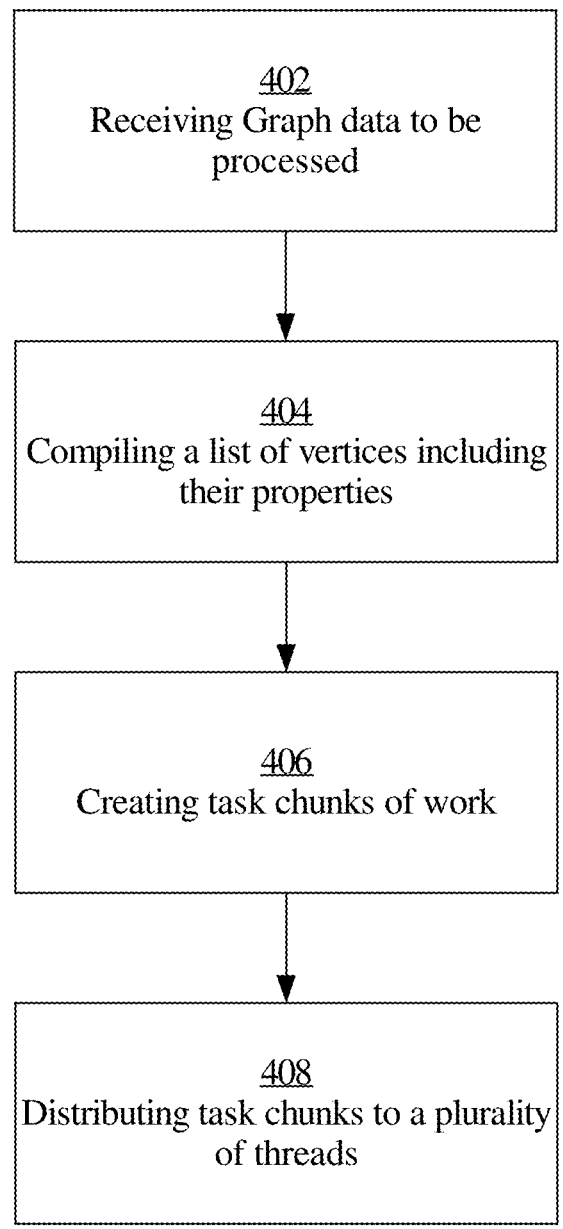
FIG. 4 depicts an embodiment of the process of a server node receiving a chunk, creating task chunks for multiple processor threads, and distributing the task chunks to the multiple processor threads.

FIG. 4 depicts an embodiment of a server node 110B receiving a chunk, creating smaller task chunks, and distributing the smaller task chunks to multiple threads. At step 402, the graph processor 114B receives a chunk from the graph process management server 112.

At step 404, the graph processor 114B compiles one or more list of vertices of the portion of the graph associated with the assigned chunk. In an embodiment, the graph processor 114B stores vertex attributes within the list of vertices. Vertex attributes may include, but are not limited to, the number of edges associated with each vertex and whether a particular edge corresponds to a local or remote vertex. A local vertex is a vertex that is within the chunk assigned to the server node 110B. A remote vertex is a vertex that is not part of the chunk assigned to the server node 110B, and therefore is assigned to another server node, such as server node 110C. Communication between remote vertices may take more processing time than communication between vertices on the same server node because of network latency. Therefore knowing whether communication is required with remote servers is helpful in creating equally sized task chunks.

In an embodiment, the graph processor 114B creates a single list of vertices including the number of edges. The list of vertices is then sorted in decreasing order based on the number edges. The graph processor 114B then creates a special index that represents a threshold number of edges. The threshold refers to a specific number of edges where all vertices have edges that that exceed the threshold are considered a super high-degree vertex. A super high-degree vertex is defined as a vertex that has a significant percentage of all vertices in the graph connected to it. These types of vertices, when contained in a single task chunk, may cause significant workload imbalance. In an embodiment, a vertex may be designated as a super high-degree vertex if its number of edges exceeds a defined $\theta$ number of edges. The defined $\theta$ number of edges is a configurable parameter.

In another embodiment, the graph processor 114B creates two lists of vertices. The first list may contain vertices and the number of corresponding edges. The second list may be categorized as a special list L which contains references to all super high-degree vertices, as defined by the configurable $\theta$ number of edges.

At step 406, the graph processor 114B uses the list of vertices to create evenly sized static task chunks for the multiple processor threads running on the server node 110B. Creating static task chunks reduces the amount of synchronization overhead that is typically required with other techniques such as dynamic task chunk creation. The graph processor 114B may implement different techniques to create evenly sized task chunks. The techniques may be based upon whether the graph analytic request from the user relates to processing that involves edge communication (neighborhood parallelism) or whether request involves vertex related calculations (vertex parallelism). Further details on creating task chunks are described in the CREATING TASK CHUNKS section herein.

At step 408, the graph processor 114B distributes the created task chunks to the available processing threads. For example, in FIG. 3, the graph processor 114B would distribute its newly created task chunks to each of the four processing threads (Cores 1-4).

Creating Task Chunks

Creating equally sized task chunks depends on the type of graph analytic request, the number of vertices, the number of edges within a received chunk, whether the edges are connected to local or remote vertices, and whether the chunk contains super high-degree vertices.

In an embodiment, the graph analytic request may include an algorithm directed to a neighborhood parallelism task. A neighborhood parallelism task is an algorithm involves communication of values between vertices along their connected edges. In the case where the required processing involves neighborhood parallelism, execution times of parallel iterations are heavily dependent on the number of edges within the task chunk. For example the following pseudo-code calculates a value "foo" for each vertex, where "foo" is the summation of neighboring vertex values "bar" from each neighbor:

```
foreach( n: .nodes)         // for every node n in the graph
    foreach ( t:n.nbrs)     // for every neighbor t of node n
        t.foo += n.bar      // accumulate n.bar into n.foo
```

Neighborhood parallel tasks are heavily dependent on the amount of neighbors each vertex has and therefore require measuring the number of edges to determine how long a specific task chunk will take.

Figure 5A:
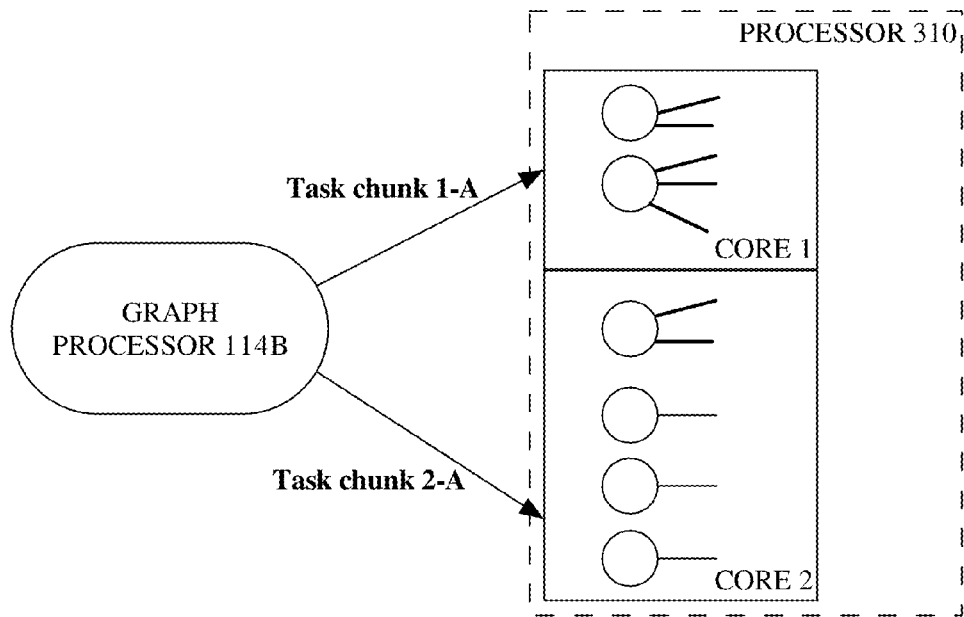
FIGS. 5A and 5B depict an embodiment of task chunk creation by a server node, where the task chunks are based upon the number of edges per task chunk.

FIG. 5A depicts an embodiment of task chunk creation where the graph processor 114B creates static task chunks (task chunk 1-A and task chunk 2-A) based on the number of edges. Task chunk 1-A has 5 edges and is assigned to core 1 of processor 310. Task chunk 2-A has 5 edges and is assigned to core 2 of processor 310. Since the task is a neighborhood parallel algorithm both task chunk 1-A and task chunk 2-A have the same number of edges and the work assigned to each processing thread will likely take the same amount of time and therefore reduce any bottleneck.

Figure 5B:
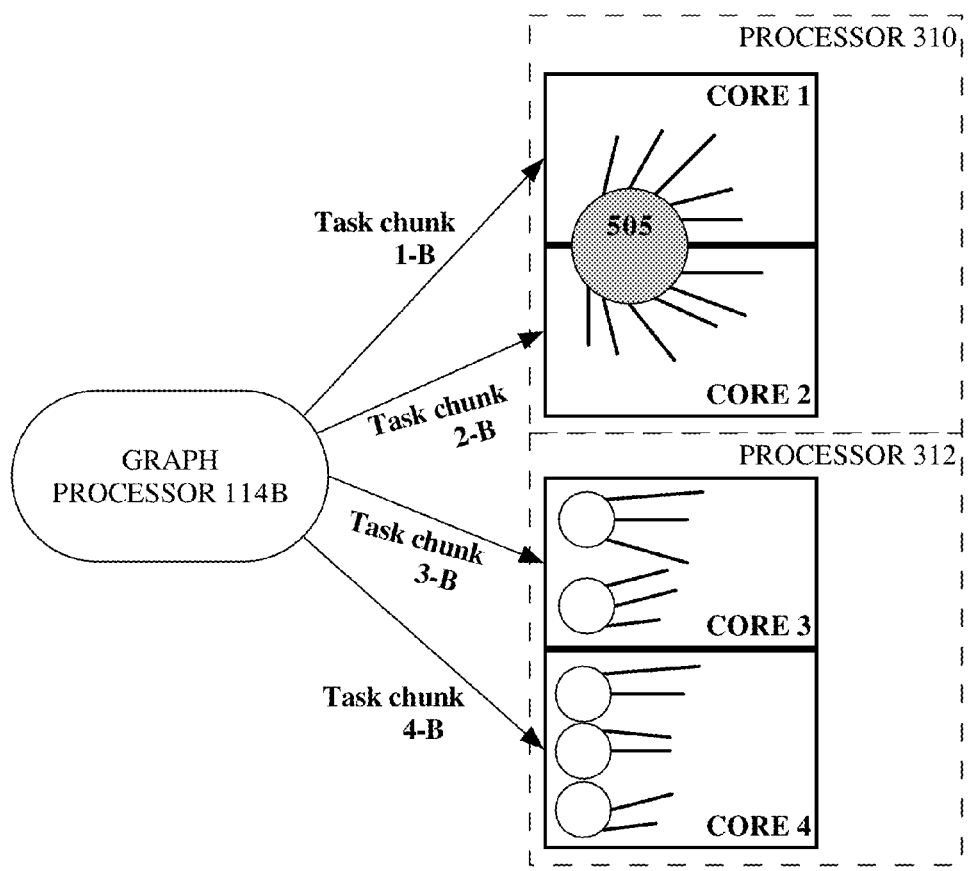

FIG. 5B depicts an embodiment of task chunk creation involving a super high-degree vertex. The graph processor 114B first creates task chunks 1-B and 2-B which distributes the super high-degree vertex 505. Then the graph processor 114B creates task chunks 3-B and 4-B for the remaining vertices. Task 1-B contains 5 edges from vertex 505 and task 2-B contains the remaining 6 edges from vertex 505. Although, task 2-B contains one more edge than task 1-B, the graph processor 114B attempts to divides the number of edges as evenly as possible. Task 3-B and task 4-B each contain 6 edges. Therefore in terms of parallel processing, it is likely that task 1-B may finish first but, the other remaining tasks 2-B, 3-B, and 4-B will run in parallel with little bottlenecks. When dividing a super high-degree vertex between two or more task chunks the graph processor 114B must synchronize the calculated values for the super high-degree vertex between the two or more task chunks. Synchronizing a super high-degree vertex is discussed in detail in the SUPER HIGH-DEGREE VERTEX section herein.

In an embodiment of task chunk creation, the graph processor 114B may assign different weights to local edges versus remote edges. When creating task chunks where the list of vertices includes denoting which edges are local edges and which edges are remote edges, the graph processor may calculate a workload value as follows:

$$\text{Workload} = \alpha^*(\text{number of local edges}) + \beta^*(\text{number of remote edges})$$

Where $\alpha$ is a configured weight coefficient assigned to local edges and $\beta$ is a configured weight coefficient assigned to remote edges. For example, the graph processor 114B may be configured to use an $\alpha$ weight coefficient value that is much lower than the $\beta$ weight coefficient value. By doing so, the remote edges are weighted much heavier than local edges. The reason for doing so is because the amount of latency for remote vertex communication is much higher than local vertex communication. Weight coefficients are a configurable parameter and may be configured to accurately account for latency or other discrepancies between local and remote edges.

In another embodiment of task chunk creation, the graph processor 114B may be configured to apply different work methods for different types of vertices. For example, the graph processor 114B may use one set of $\alpha$ and $\beta$ weight coefficient values for super high-degree vertices and another set of $\alpha$ and $\beta$ weight coefficient values for other low-degree vertices. In an embodiment, the application of more than one work method may be determined by a DSL and compiler as described in U.S. patent application Ser. No. 14/543,058.

In an embodiment of task chunk creation, the graph processor 114B may use vertex parallelism to create evenly sized task chunks. Vertex parallelism refers to an algorithm that calculates a value for a vertex based upon some property related to the vertex itself, as opposed to its neighbors. For example, the following pseudo-code calculates a value "foo" for each node where the value of "foo" equals the value of attribute "bar":

```
Foreach (n: .nodes)      //for every node n in the graph
    n.foo = n.bar        // copy n.bar into n.foo
```

A vertex parallel task, as the example above, requires the use of a static chunking technique where the graph processor 114B creates task chunks based upon the number of vertices.

Super High-Degree Vertex

In order to avoid performance bottlenecks from super high-degree vertices, the graph processor splits the edges from a super high-degree vertex into two or more task chunks. One technique for processing a graph analytic request is to synchronize the calculated value of a super high-degree vertex that has been split between two or more task chunks. However, the drawback to this technique is that it may add significant processing overhead to the two or more task chunks that are processing the super high-degree vertex because of significant synchronization between tasks chunks during the iteration itself.

Figure 6A:
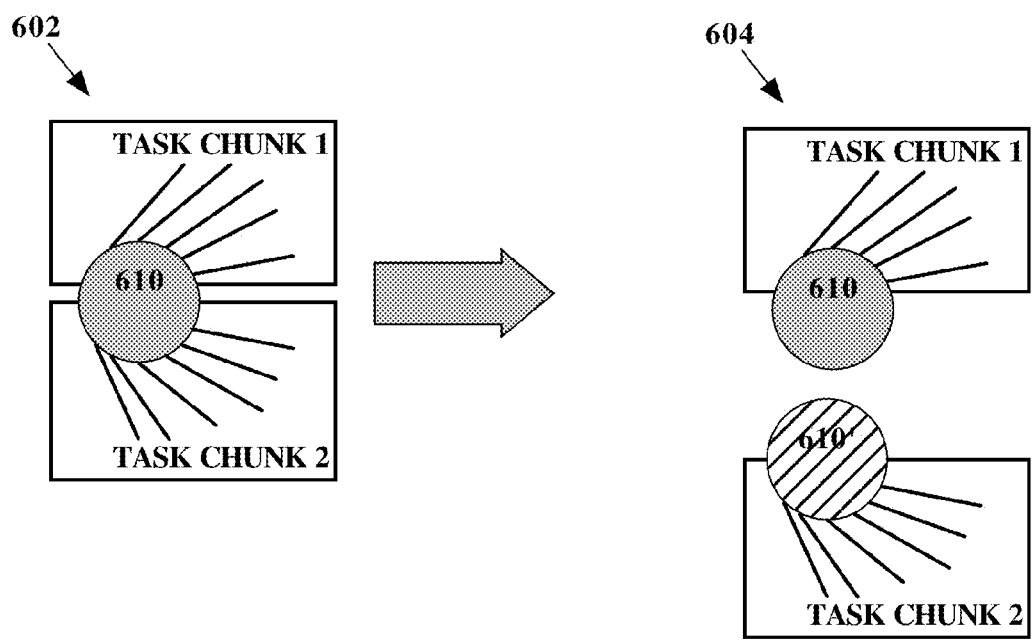
FIGS. 6A and 6B depict an embodiment of the copying of a super high-degree vertex into multiple task chunks for the purpose of reducing synchronization steps.

In an embodiment, the graph processor may make a copy of the super high-degree vertex so that each task chunk may calculate the requested value of the super high-degree vertex in parallel and then after the task chunk iteration is completed, the requested value from the copied super high-degree vertex may be combined with the requested value of the original super high-degree vertex. For example, FIG. 6A depicts an embodiment of the copying of the super high-degree vertex for the purpose of calculating a summation of attributes from neighbors of each vertex. Diagram 602 depicts the splitting of a super high-degree vertex into two task chunks where task chunk 1 contains 5 edges and task chunk 2 contains the remaining 6 edges related to vertex 610. Diagram 604 depicts the copying of vertex 610 so that task chunk 1 retains the original vertex 610 and task chunk 2 contains vertex 610'. The task chunk iteration is completed when both task chunk 1 and task chunk 2 processing are complete. After the task chunk iteration is complete, the graph processor combines the calculated value from vertex 610', which is held in a temporary variable, to the calculated value of vertex 610. In this example since the calculation involved a summation of values, the value of vertex 610' is added to the value of vertex 610.

In another embodiment if the super high-degree vertex is split among more than two task chunks, then multiple copies of the super high-degree vertex are created and combined after the iteration for each task chunk is complete.

In order to maintain clean data values, the calculated values for a split super high-degree vertex may not be read until the task iteration is complete and all values from copied vertices have been synchronized to the original value of the vertex.

Figure 6B:
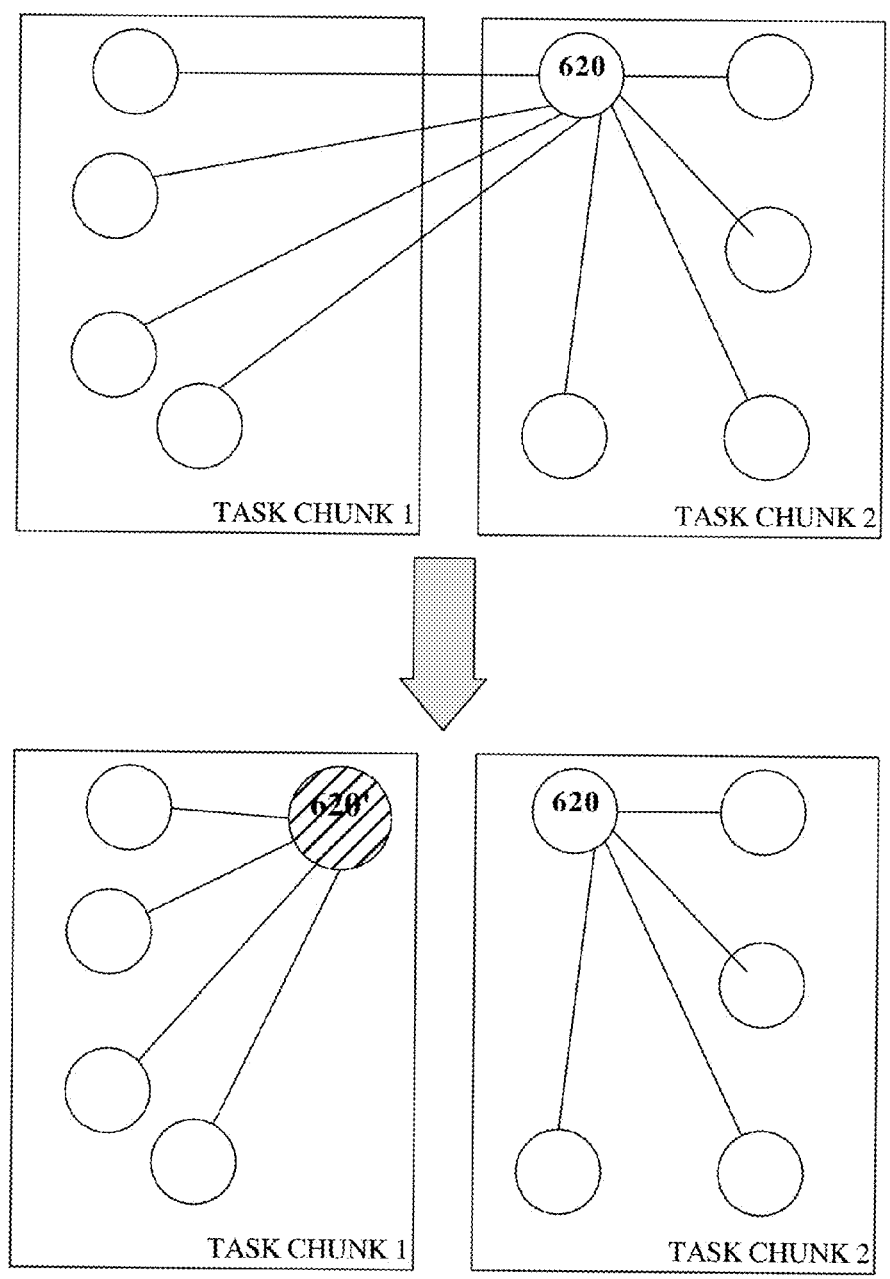

In another embodiment, the copying technique may be used if vertices of one task chunk are connected to a remote super high-degree vertex. For example, FIG. 6B depicts an embodiment where the vertices in task chunk 1 are connected to a super high-degree vertex 620, which is located in task chunk 2. In order to reduce remote communication between task chunk 1 and task chunk 2, the graph processor makes a copy vertex 620 (vertex 620') and places it in task chunk 1. Then after the task chunk iteration for both task chunks is complete, the graph processor synchronizes the calculated value for vertex 620 by combining the values of vertex 620' and vertex 620.

Graph Data

As noted previously, graph database 120 stores datasets about one or more graphs, each comprising multiple vertices and edges. A graph comprises vertices and edges that represent relationships between the vertices. Two vertices that are connected to each other by an edge and are considered neighbors of each other. A vertex may have many edges and, thus, many neighbors.

If graph database 120 stores multiple graphs, then each graph represents a different set of data that is to be treated separately for graph analysis purposes. For example, one graph set may reflect relationships among users in one social network while another graph set may reflect relationships among users in another social network. As another example, one graph set may reflect relationships among users in a social network while another graph set may reflect connections among computing devices in a network.

Graph database 120 may be a relational database or an object database. For example, one vertex table in graph database 120 may include a row for each vertex in a graph. (Graph database 120 may store a different vertex table for each graph represented in the graph data.) Each column in the vertex table may correspond to a different attribute or property of the vertex, such as a name, an age, and a date, depending on the type of object the nodes represent.

A vertex in a graph may represent one of many different types of objects while edges that connect two vertices in the graph may represent one of many different types of relationships between the objects. Embodiments are not limited to any particular type of object or type of relationship.

For example, vertices in a graph may represent user accounts maintained by a social network that is provided by a social network provider, such as Facebook, Google+, LinkedIn, and Twitter. An edge in such a graph may represent that the two connecting vertices have established a relationship with each other or that one of the connecting vertices has decided to "follow" the other node (as in Twitter). As another example, vertices in a graph may represent a network, such as the Internet, and edges in the graph may represent that computing devices are physically coupled to each other.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
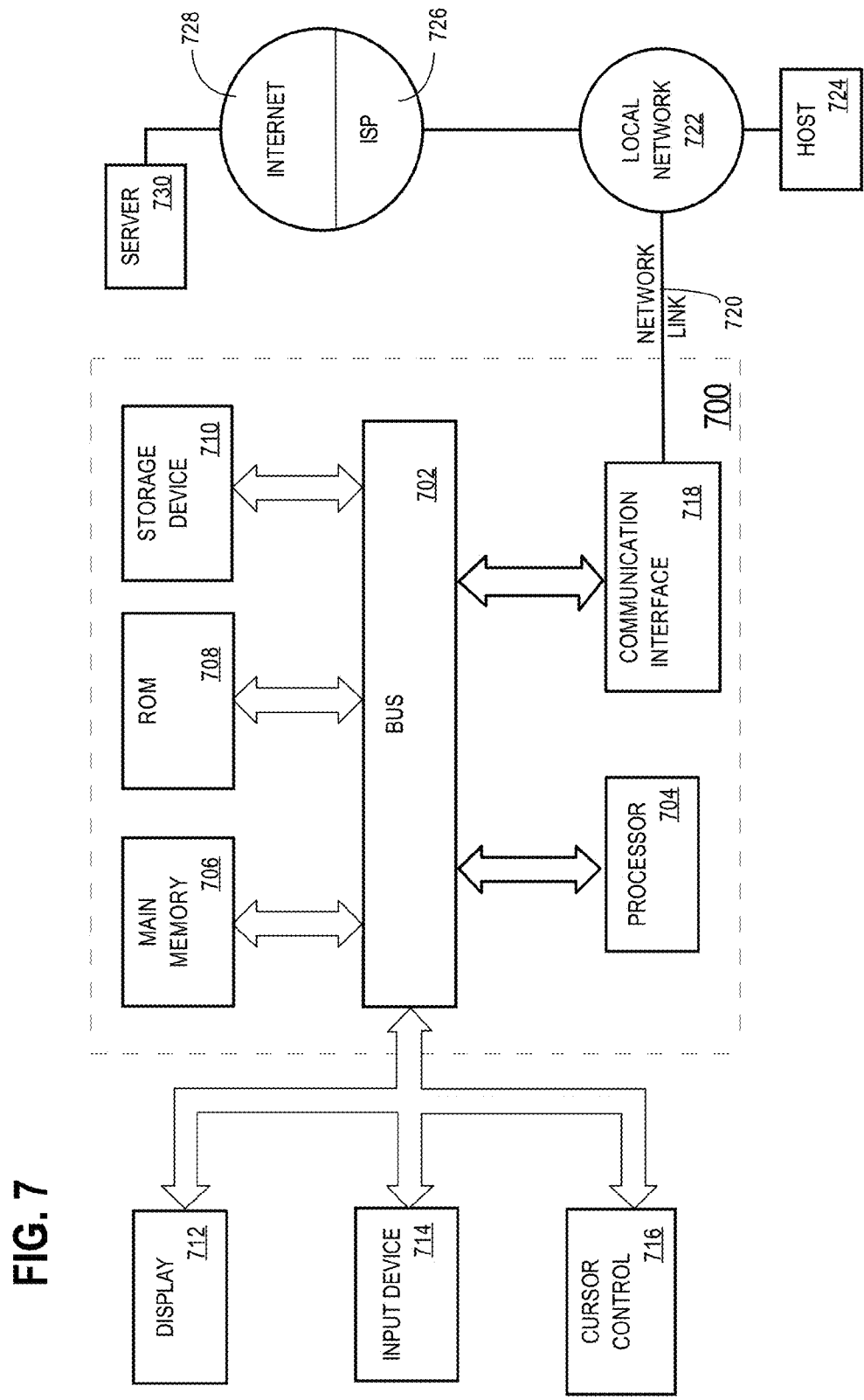
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving graph data to be processed by a server node of a graph processing system;
      wherein the graph data comprises a plurality of vertices and a plurality of edges of a portion of a graph, wherein the plurality of edges include local edges and remote edges, wherein each local edge of the local edges is attached to a pair of vertices in the plurality of vertices, wherein each remote edge of the remote edges is attached to vertex not in the plurality of vertices;
      for the graph data received, generating a list edge properties of the plurality of vertices, wherein for each vertex of the plurality of vertices, respective edge properties of the each vertex include a number of local edges and a number of remote edges attached to each vertex;
      creating task chunks by at least assigning vertices of the plurality of vertices to the task chunks based on the numbers of local edges and the numbers of remote edges of the plurality of vertices; and
      distributing the task chunks to one or more threads available on the server node.

2. The method of claim 1, wherein the respective edge properties for each vertex in the list of vertices includes a total number of edges from the each vertex to neighboring vertices.

3. The method of claim 2, wherein creating task chunks is based on a number of edges allocated to each chunk of work.

4. The method of claim 3, wherein creating task chunks is based on a total number of local edges and a total number of remote edges.

5. The method of claim 4, wherein creating task chunks based on the total number of local edges and the total number of remote edges assigns a particular local weight to the total number of local edges and assigns a particular remote weight to the total number of remote edges.

6. The method of claim 5, wherein the particular local weight and the particular remote weight are configurable.

7. The method of claim 2, wherein creating task chunks involve including all edges of a vertex within a single task chunk.

8. The method of claim 2, wherein creating task chunks involve partitioning edges of a vertex of said list of vertices into two or more task chunks.

9. The method of claim 1, wherein the respective edge properties for each vertex in the list of vertices includes a total number of local edges from a particular vertex to neighboring vertices located within the graph data to be processed by the server node and a total number of remote edges from the particular vertex to neighboring vertices located within other graph data to be processed by another server node.

10. The method of claim 1, wherein creating task chunks is based on number of vertices allocated to each task chunk.

11. One or more non-transitory storage media storing instructions which, when executed by one or more computing devices, causes:
   receiving graph data to be processed by a server node of a graph processing system;
      wherein the graph data comprises a plurality of vertices and a plurality of edges of a portion of a graph, wherein the plurality of edges include local edges and remote edges, wherein each local edge of the local edges is attached to a pair of vertices in the plurality of vertices, wherein each remote edge of the remote edges is attached to vertex not in the plurality of vertices;
      for the graph data received, generating a list edge properties of the plurality of vertices, wherein for each vertex of the plurality of vertices, respective edge properties of the each vertex include a number of local edges and a number of remote edges attached to each vertex;
      creating task chunks by at least assigning vertices of the plurality of vertices to the task chunks based on the numbers of local edges and the numbers of remote edges of the plurality of vertices; and
      distributing the task chunks to one or more threads available on the server node.

12. The one or more non-transitory storage media of claim 11, wherein the respective edge properties for each vertex in the list of vertices includes a total number of edges from the each vertex to neighboring vertices.

13. The one or more non-transitory storage media of claim 12, wherein creating task chunks is based on a number of edges allocated to each chunk of work.

14. The one or more non-transitory storage media of claim 13, wherein creating task chunks is based on a total number of local edges and a total number of remote edges.

15. The one or more non-transitory storage media of claim 14, wherein creating task chunks based on the total number of local edges and the total number of remote edges assigns a particular local weight to the total number of local edges and assigns a particular remote weight to the total number of remote edges.

16. The one or more non-transitory storage media of claim 15, wherein the particular local weight and the particular remote weight are configurable.

17. The one or more non-transitory storage media of claim 12, wherein creating task chunks involve including all edges of a vertex within a single task chunk.

18. The one or more non-transitory storage media of claim 12, wherein creating task chunks involve partitioning edges of a vertex of said list of vertices into two or more task chunks.

19. The one or more non-transitory storage media of claim 11, wherein the respective edge properties for each vertex in the list of vertices includes a total number of local edges from a particular vertex to neighboring vertices located within the graph data to be processed by the server node and a total number of remote edges from the particular vertex to neighboring vertices located within other graph data to be processed by another server node.

20. The one or more non-transitory storage media of claim 11, wherein creating task chunks is based on number of vertices allocated to each task chunk.

* * * * *

UNITED STATES PATENT AND TRADEMARK OFFICE
CERTIFICATE OF CORRECTION

| | | |
|---|---|---|
| PATENT NO. | : 9,740,536 B2 | Page 1 of 1 |
| APPLICATION NO. | : 14/718430 | |
| DATED | : August 22, 2017 | |
| INVENTOR(S) | : van der Lugt et al. | |

It is certified that error appears in the above-identified patent and that said Letters Patent is hereby corrected as shown below:

In the Specification

In Column 5, Line 8, delete "that that" and insert -- that --, therefor.

Signed and Sealed this
Twenty-ninth Day of May, 2018

Andrei Iancu
*Director of the United States Patent and Trademark Office*